US009421739B2

(12) United States Patent
Humfeld

(10) Patent No.: US 9,421,739 B2
(45) Date of Patent: Aug. 23, 2016

(54) GRAPHENE AEROSPACE COMPOSITES

(71) Applicant: The Boeing Company, Chicago, IL (US)

(72) Inventor: Keith Daniel Humfeld, Federal Way, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/589,085

(22) Filed: Jan. 5, 2015

(65) Prior Publication Data

US 2016/0193809 A1    Jul. 7, 2016

(51) Int. Cl.

| B32B 9/00 | (2006.01) |
|---|---|
| B32B 3/26 | (2006.01) |
| B32B 7/04 | (2006.01) |
| B32B 3/28 | (2006.01) |
| B32B 9/04 | (2006.01) |
| B32B 37/06 | (2006.01) |

(Continued)

(52) U.S. Cl.
CPC ............ *B32B 9/007* (2013.01); *B29C 45/02* (2013.01); *B32B 3/266* (2013.01); *B32B 3/28* (2013.01); *B32B 7/04* (2013.01); *B32B 9/04* (2013.01); *B32B 37/06* (2013.01); *B32B 37/14* (2013.01); *B29K 2063/00* (2013.01); *B29K 2307/04* (2013.01); *B32B 2305/076* (2013.01); *B32B 2305/72* (2013.01); *B32B 2307/72* (2013.01); *B32B 2605/18* (2013.01)

(58) Field of Classification Search
CPC ....... H01L 24/13; H01L 24/16; H01L 24/24; H01L 24/48; H01L 24/49; H01L 24/94; H01L 24/96; H01L 29/0665; H01L 29/0669; H01L 29/0673; H01L 29/127; H01L 29/1608; H01L 29/32
See application file for complete search history.

(56) References Cited

U.S. PATENT DOCUMENTS 8,647,548 B1    2/2014  Humfeld
8,715,609 B2    5/2014  Humfeld et al.
(Continued)

FOREIGN PATENT DOCUMENTS

CN      102409528 A    4/2012
CN      103015157 A    4/2013
(Continued)

OTHER PUBLICATIONS

Matei, Dan G. et al., "Functional Single-Layer Graphene Sheets from Aromatic Monolayers," Advanced Materials, 2013, 25, 4146-4151, Wiley-VCH Verlag GmbH & Co., KGaA, Weinhein, Germany.
U.S.P.T.O Office Action in co-pending U.S. Appl. No. 14/589,057 mailed Nov. 20, 2015.
(Continued)

*Primary Examiner* — Kyoung Lee
(74) *Attorney, Agent, or Firm* — Ostrager Chong Flaherty & Broitman P.C.

(57) ABSTRACT

Composite prepreg materials made from a plurality of layers of graphene film having a size that spans an entire width and an entire length of the composite prepreg material, each of the layers of graphene film being functionalized with holes formed through the graphene film, amine groups formed on both an upper and a lower surface of the graphene film, epoxide groups formed on at least one edge of the graphene film, amine monomers and/or epoxy monomers. The plurality of layers may be formed by stacking a plurality of layers of graphene film to form a stacked composite prepreg material or by folding a graphene film to form a crumpled composite prepreg material.

28 Claims, 12 Drawing Sheets

(51) Int. Cl.
 *B32B 37/14* (2006.01)
 *B29C 45/02* (2006.01)
 *B29K 63/00* (2006.01)
 *B29K 307/04* (2006.01)

(56) References Cited

U.S. PATENT DOCUMENTS

| | | |
|---|---|---|
| 2011/0017587 A1 | 1/2011 | Zhamu et al. |
| 2012/0077020 A1 | 3/2012 | Muramatsu |
| 2012/0298396 A1 | 11/2012 | Hong et al. |
| 2012/0330044 A1 | 12/2012 | Hou et al. |
| 2013/0034724 A1 | 2/2013 | Sodano |
| 2013/0164498 A1* | 6/2013 | Langone .......... B32B 5/28 428/141 |
| 2014/0121350 A1 | 5/2014 | You et al. |
| 2014/0308517 A1 | 10/2014 | Zhamu et al. |

FOREIGN PATENT DOCUMENTS

| | | |
|---|---|---|
| CN | 103614902 A | 3/2014 |
| CN | 103396586 B | 11/2014 |
| JP | 2008248457 A | 10/2008 |
| KR | 101436500 B1 | 10/2014 |
| WO | 2007130979 A2 | 11/2007 |
| WO | 2012058553 A2 | 5/2012 |
| WO | 2012094634 A2 | 7/2012 |
| WO | 2012094634 A3 | 7/2012 |
| WO | 2013191809 A1 | 12/2013 |
| WO | 2014172619 A1 | 10/2014 |

OTHER PUBLICATIONS

European Search Report in corresponding application No. EP 15188442.6, dated Apr. 6, 2016.
European Search Report in related application number EP 15186441.8, dated May 20, 2016, of The Boeing Company.
Database WPI, Week 201433, Thomson Scientific, London, GB; AN 2014-H03644, XP002757211, Shanghai Inst. Technology, Mar. 5, 2014.
Database WPI, Week 201474, Thomson Scientific, London, GB; AN 2014-U10828, XP002757154, Korea Inst. Machinery & Materials, Oct. 17, 2014.
Database WPI, Week 201251, Thomson Scientific, London, GB; AN 2012-E63084, XP002757212, Harbin Inst. Technology, Apr. 11, 2012.
Database WPI, Week 201370, Thomson Scientific, London, GB; AN 2013-P18120, XP002757215, Univ. Tianjin Polytechnic, Apr. 3, 2013.
Database WPI, Week 200876, Thomson Scientific, London, GB; AN 2008-M91181, XP002757213, Mitsui Bussan KK, Oct. 16, 2008.
European Search Report in related application No. EP 15188443.4, dated May 13, 2016, of The Boeing Company.
Federico, Bosia et al., "In Silico Tensile Tests and Design of Hierarchical Graphene Fibres and Composites," Physica Status Solidi. B, Basic Research, vol. 250, No. 8, Jul. 24, 2013, pp. 1492-1495.
USPTO Office Action mailed Jun. 23, 2016 in related U.S. Appl. No. 14/865,820.

* cited by examiner

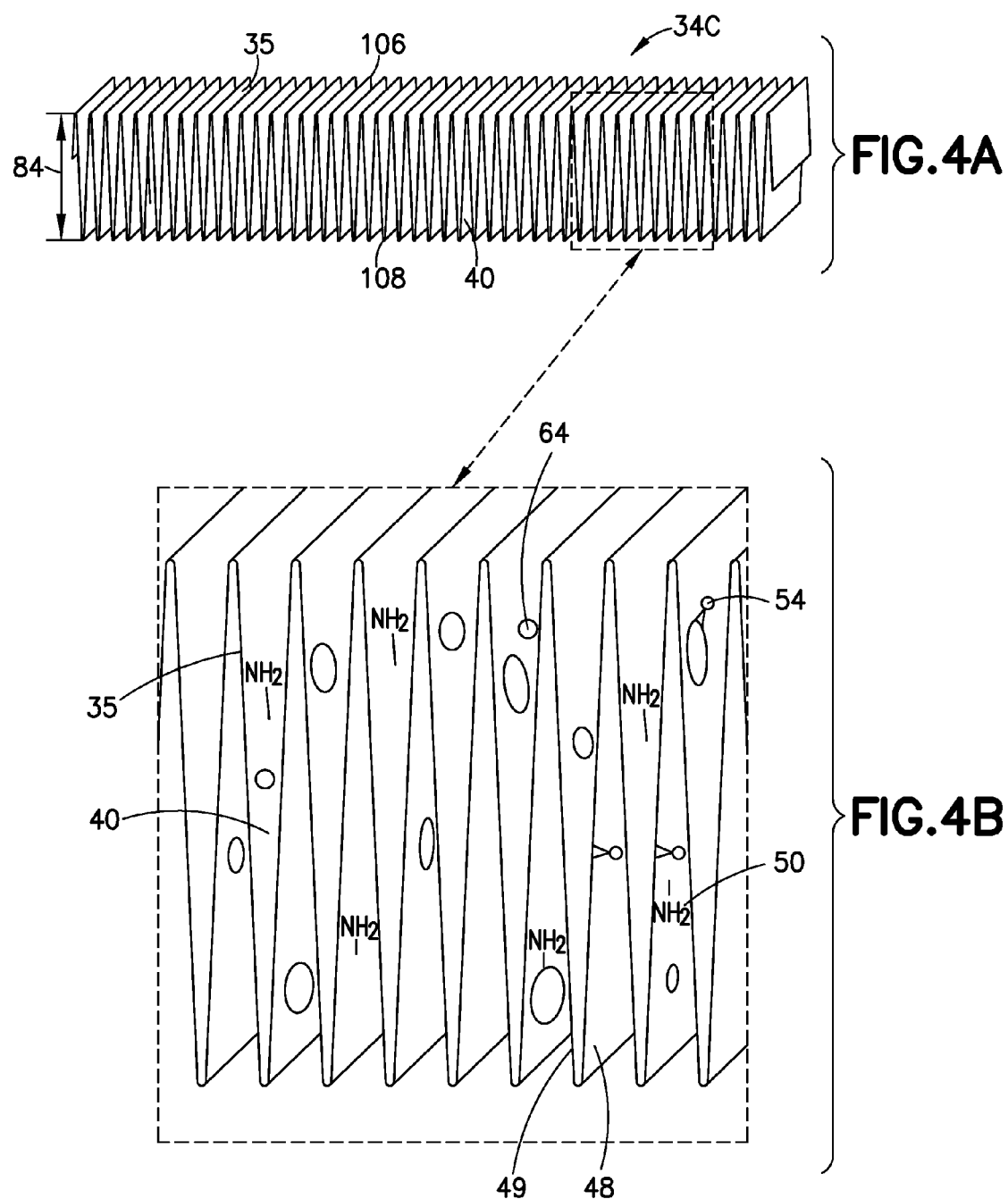

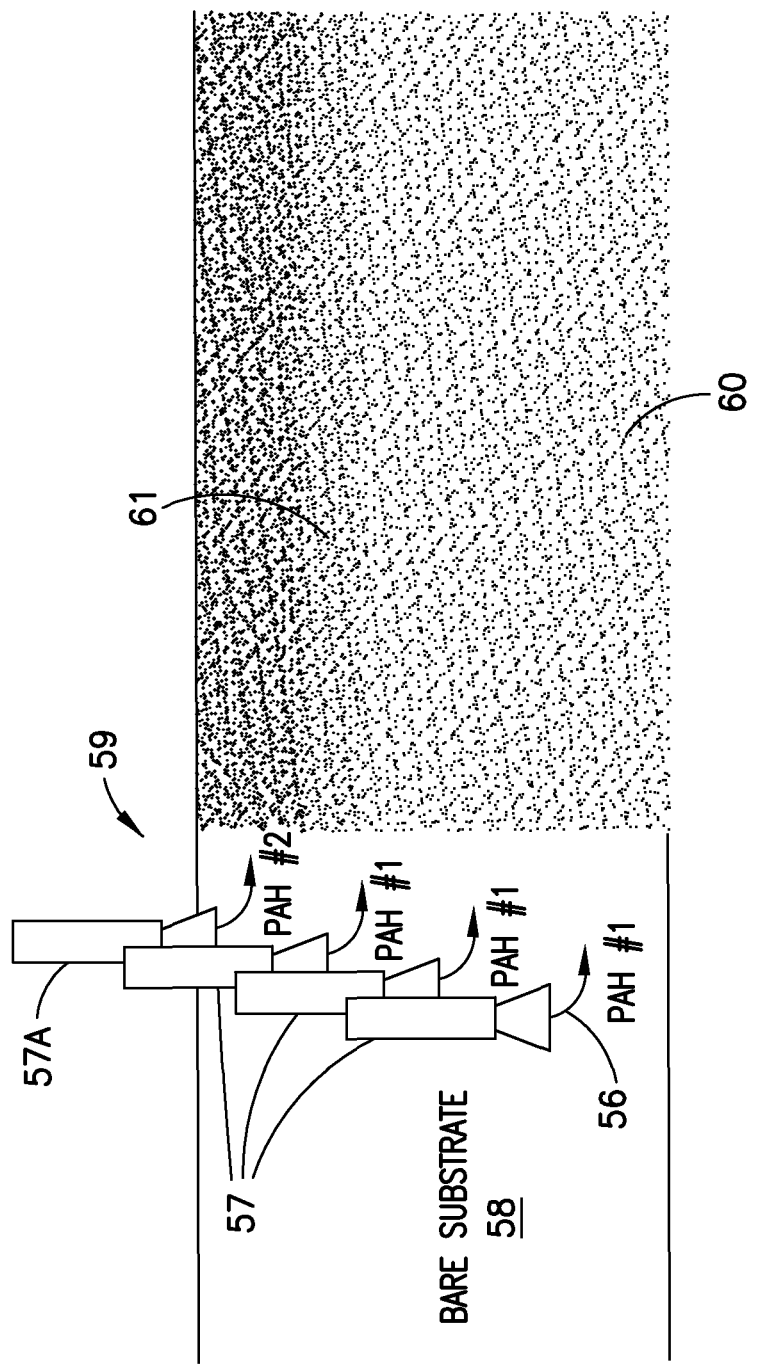

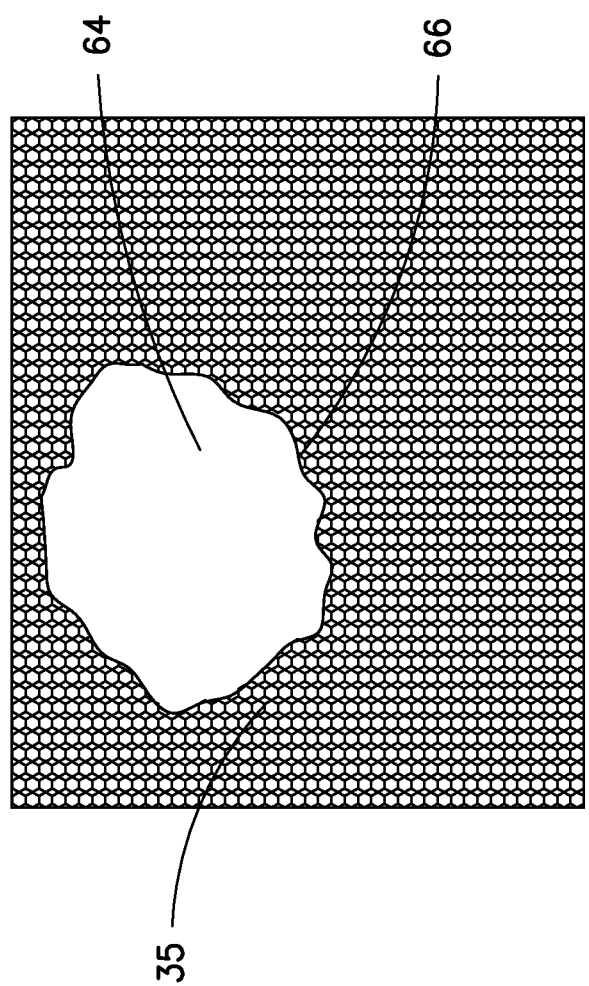

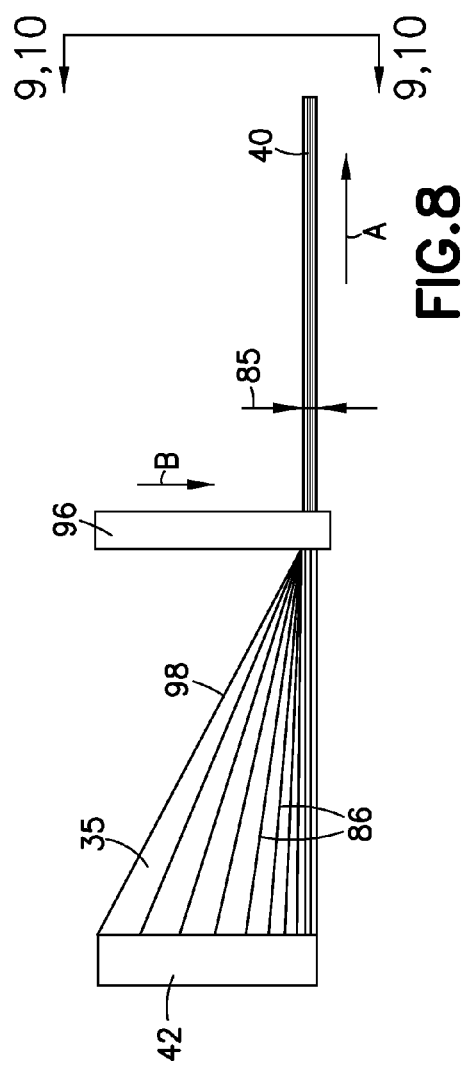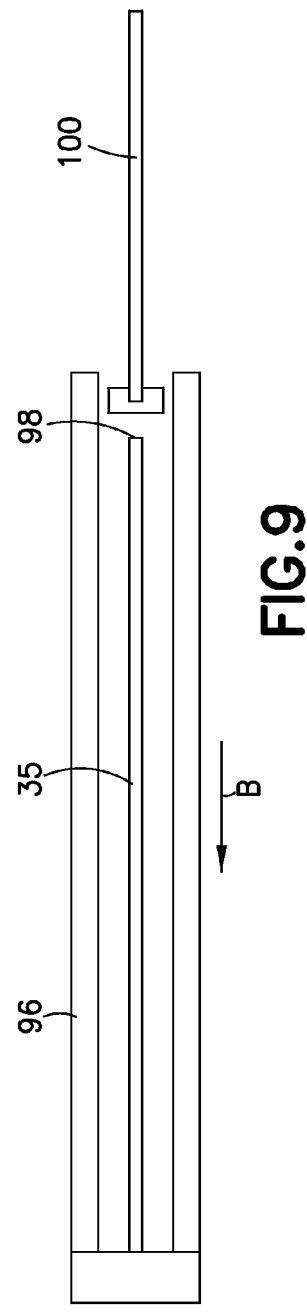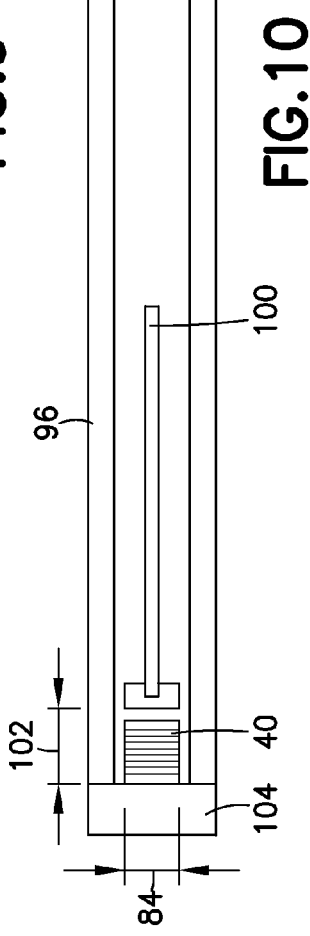

GRAPHENE AEROSPACE COMPOSITES

TECHNICAL FIELD

This disclosure generally relates to composite materials formed from graphene sheets or films, composite structures including component parts made from graphene composite materials, and methods for manufacturing graphene composite materials and composite structures with component parts made from graphene composite materials.

BACKGROUND

Composite materials are used in the manufacture of a wide variety of structures and component parts due to their high strength and rigidity, low weight, corrosion resistance and other favorable properties. For example, in the aerospace industry, composite materials are becoming widely used to manufacture aerospace structures and component parts for aerospace structures such as aircraft ribs, spars, panels, fuselages, wings, wing boxes, fuel tanks, tail assemblies and other component parts of an aircraft because they are lightweight and strong, and therefore provide fuel economy and other benefits. As used herein, the term "composite structure" means a structure that is manufactured, fabricated or assembled, in whole or in part, from one or more component parts made from composite materials (i.e., composite components) including, without limitation, aerospace structures.

One type of composite material commonly used in the aerospace industry is carbon fiber reinforced plastic ("CFRP"). CFRP generally comprises one or more composite layers or plies laminated together to form a sheet, laminate or layup. Each of the composite layers or plies comprises a reinforcement material and a matrix material. The matrix material surrounds, binds and supports the reinforcement material, and is generally a non-conductive polymer such as an epoxy resin. For aerospace applications, an aerospace grade resin is used as the matrix material, typically having four (4) epoxide groups in each epoxy monomer molecule to form multiple connections. The reinforcement material provides structural strength to the matrix material and the CFRP, and generally consists of strands of carbon fiber or carbon filaments, which are electrically conductive. Carbon fibers are typically formed as carbon tows comprising a defined number of carbon filaments. For aerospace applications, carbon tows may comprise bundles of carbon filaments ranging from about 1,000 to about 24,000 carbon filaments; carbon tows having up to about 300,000 carbon filaments may be used in other applications.

It is desirable to increase the amount of carbon in CFRP to further improve mechanical and/or electrical properties of composite structures without increasing weight or disturbing other desirable properties. But, simply increasing the amount of carbon fiber reinforcement material in CFRP does not meet this goal and is not cost efficient. Other forms of carbon, such as graphene, which has exceptional mechanical strength and thermal conductivity, would have beneficial effects in composite structures. Graphene is a hexagonal array of carbon atoms extending over two dimensions (i.e., it is one atom thick) that is typically produced in small flakes (or nanoplatelets). Each carbon atom in graphene is covalently bonded to three other carbon atoms, providing exceptional strength. However, mixing graphene into an epoxy resin comprising carbon fibers makes the epoxy resin weaker to strain in every direction because graphene will not bond with the carbon fibers and does not interact much with the epoxy resin.

Accordingly, there is room for improving the mechanical and electrical properties of composite structures and related methods for manufacturing composite structures that provide advantages over known composite structures and manufacturing methods.

SUMMARY

The foregoing purposes, as well as others, are achieved with a composite prepreg material comprising a plurality of layers of graphene film, each of the layers of graphene film having a size that spans an entire width and an entire length of the composite material. Each layer of graphene film is functionalized with one or more of holes formed through the graphene film, amine groups formed on one or more surfaces of the graphene film, and/or epoxide groups formed on at least one edge of the graphene film. The plurality of layers of graphene film are formed either by stacking multiple layers of graphene on top of one another such that upper and lower surfaces of adjacent layers of graphene film are in contact and bonded together through epoxy-amine bonds, or the plurality of layers of graphene film may be formed by alternately folding a graphene film along spaced lines to form a crumpled graphene sheet having a height that spans an entire height of the composite prepreg material, where the graphene film folds together such that upper and lower surfaces of adjacent layers of graphene film are in contact.

In one embodiment of a composite prepreg material, the graphene film is functionalized with holes having a size of about 12-80 carbon atoms, amine groups having a surface density on both upper and lower surfaces of the graphene film of about 4.0E10 to about 4.0E13 groups per square millimeter of the graphene film, and a density of epoxide groups formed on at least one of the edges of the graphene film of about 7,000 to about 1,400,000 groups per millimeter, including edges formed by the holes. The graphene film further comprises a density of amine monomers (such as 44'DDS) and epoxy monomers (such Bisphenyl F) on a surface of the graphene film of about 1.0E-3 to about 4.0E-2 grams per square meter. Multiple layers of the graphene film of this embodiment are stacked and bonded together through epoxy-amine bonds with functional sites on adjacent graphene films or with epoxy-amine macromolecules made from the amine and epoxy monomers, resulting in a composite prepreg material that is a substitute for traditional prepreg materials, such as the CFRP materials described in the Background. This result may also be achieved by adding only epoxy monomers and functionalizing the graphene film with a higher density of amine groups, or by adding only amine monomers and functionalizing the graphene film with a higher density of epoxide groups.

In another embodiment of a composite prepreg material, the graphene film is functionalized with holes having a size of about 6-19 carbon atoms, amine groups having a surface density on both upper and lower surfaces of the graphene film of about 4.0E10 to about 4.0E13 groups per square millimeter of the graphene film, and a density of epoxide groups formed on at least one of the edges of the graphene film of about 7,000 to about 1,400,000 groups per millimeter, including edges formed by the holes. This embodiment does not include amine monomers or epoxy monomers, and therefore does not include any resin. Epoxy-amine bonds are formed in this and the previous embodiment between adjacent layers of the graphene film when heat is applied to form the composite prepreg material.

In yet another embodiment of a composite prepreg material, the graphene film is folded along spaced-apart lines to form a crumpled graphene sheet having a height that spans an entire height of the composite prepreg material. The graphene film for this embodiment is functionalized with holes having a size of more than about 100 carbon atoms, amine groups having a surface density on upper and lower surfaces of the graphene film of about 4.0E10 to about 4.0E13 groups per square millimeter of the graphene film, and epoxide groups formed on the edges of the graphene film of about 7,000 to about 1,400,000 groups per millimeter, including edges formed by the holes. The graphene film further comprises a density of amine monomers (such as 44'DDS) and epoxy mononers (such Bisphenyl F) on a surface of the graphene film of about 1.0E-3 to about 4.0E-2 grams per square meter. After the graphene film is folded to form the crumpled graphene sheet, a resin film is hot pressed onto both the top and bottom surfaces of the crumpled graphene sheet and then cured to form a crumpled prepreg composite material. Alternatively, the crumpled graphene sheet may be formed into the final product shape and Resin Transfer Molding (RTM) may be used to infuse resin into the crumpled graphene sheet. In this embodiment, the crumpled prepreg composite material has improved graphitic carbon content as compared to traditional CFRP and improved load transfer between the resin film and the carbon in the graphene film. The composite prepreg material is a macromolecule comprised of the base amine monomer (such as 44"DDS), base epoxy monomer (such as Bisphenyl F) and a single graphene molecule.

In accordance with a method of the disclosure, a method of making a composite prepreg material is provided. The graphene film is layered and the layers of graphene film are laminated or bonded together to form the composite prepreg material. The composite prepreg material may optionally be combined with a resin matrix material and cured to form a composite material with increased strength, stiffness and modulus for use in composite structures.

Composite structures, including aerospace structures, comprising component parts made with the disclosed graphene composite prepreg materials, aircraft comprising such composite structures, and methods for making such composite structures are also considered to be within the scope of the present disclosure. Other objects, features, and advantages of the various embodiments in the present disclosure will be explained in the following detailed description with reference to the appended drawings.

BRIEF DESCRIPTION OF DRAWINGS

FIG. 4A is an illustration of one embodiment of a crumpled composite prepreg material in accordance with this disclosure.

FIG. 4B is an illustration showing a magnified view of a portion of the crumpled prepreg material in FIG. 4A.

FIG. 6 is an illustration of exemplary equipment for producing a graphene film with amine group functionalization.

FIG. 7 is an illustration of a section of a graphene film that is functionalized with a hole.

FIG. 8 is an illustration of equipment that may be used for folding a graphene film to form the crumpled composite prepreg material shown in FIGS. 4A and 4B.

FIG. 9 is an illustration of a right side view of the equipment shown in FIG. 8 before a plunger is activated to fold the graphene film.

FIG. 10 is an illustration of a right side view of the equipment shown in FIG. 8 after the plunger is activated to fold the graphene film.

DETAILED DESCRIPTION

In the following detailed description, various embodiments of composite prepreg materials are described with reference to aerospace structures to illustrate the general principles in the present disclosure. It will be recognized by one skilled in the art that the present disclosure may be practiced in other analogous applications or environments and/or with other analogous or equivalent variations of the illustrative embodiments. For example, the composite prepreg materials may be used in any industry that seeks the benefits of strong and light-weight materials. One of ordinary skill in the art will recognize and appreciate that the disclosed composite prepreg materials and related methods of making and using the disclosed composite prepreg materials can be used in any number of applications involving such vehicles and structures. It should also be noted that those methods, procedures, components, or functions which are commonly known to persons of ordinary skill in the field of the disclosure are not described in detail herein.

Figure 1:
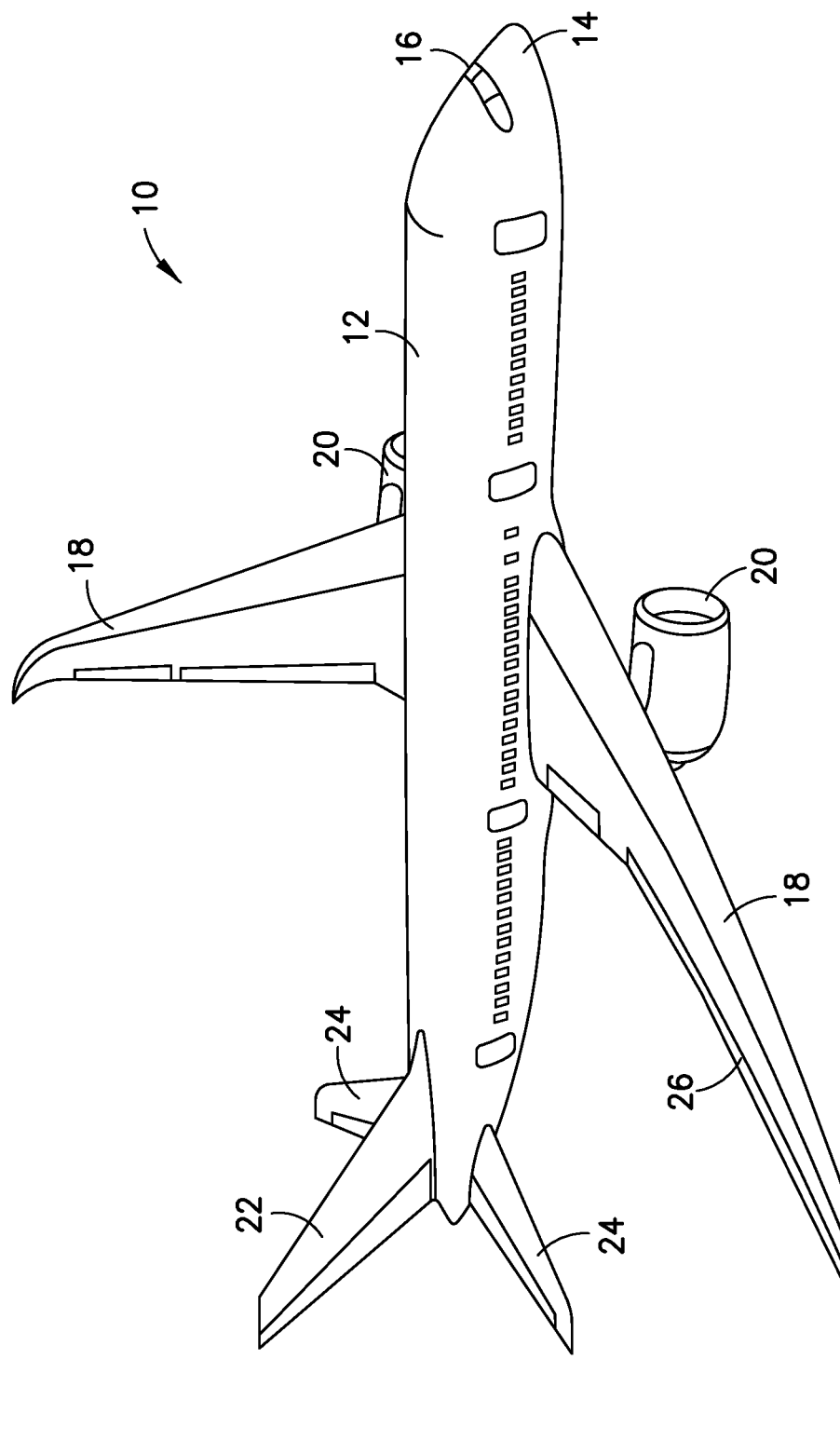
FIG. 1 is an illustration of a perspective view of an aircraft that may incorporate the composite materials disclosed herein.

Referring more particularly to the drawings, FIG. 1 is an illustration of a perspective view of an exemplary aircraft 10 that may incorporate a composite structure 26 made from the composite prepreg materials in accordance with this disclosure. As shown in FIG. 1, the aircraft 10 comprises a fuselage 12, a nose 14, a cockpit 16, wings 18, one or more propulsion units 20, a vertical tail portion 22, and horizontal tail portions 24. Although the aircraft 10 shown in FIG. 1 is generally representative of a commercial passenger aircraft having one or more composite structures 26, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable vehicles or items having composite structures.

Figure 2:
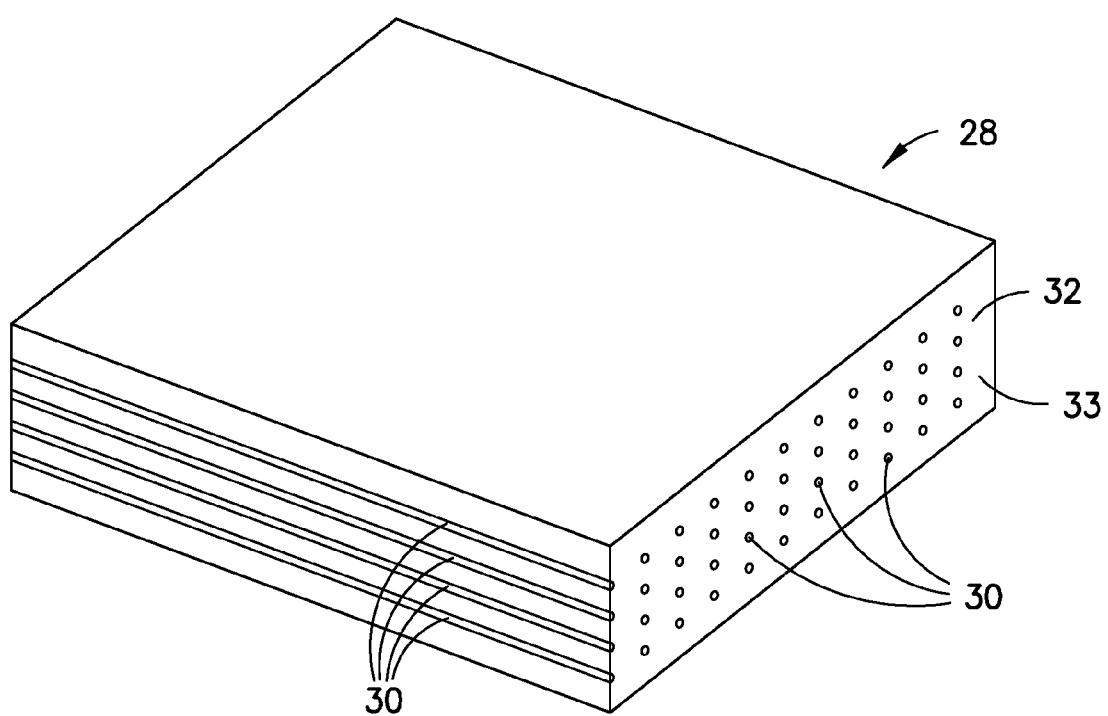
FIG. 2 is an illustration of a typical composite material comprising carbon reinforcement fibers and a matrix material.

The composite structures 26 may be any type of structure that is manufactured, fabricated or assembled, in whole or in part, from one or more component parts made from composite materials. An exemplary illustration of a typical CFRP-type of composite material 28 is shown in FIG. 2 comprising a single layer of carbon reinforcement fibers 30 impregnated with a matrix material 32. The matrix material 32 surrounds, binds and supports the carbon reinforcement fibers 30 and is generally a non-conductive polymer such as an epoxy resin 33. For aerospace applications, an aerospace-grade resin is used as the matrix material 32, having four (4) epoxide groups in each epoxy monomer molecule to form multiple connections. Typically, the molecules are tri- or tetra-functional epoxies and bifunctional amines. Since one component is at least tri-functional, the result of the extensive epoxy-amine chemical reaction is a dendrimeric structure, which provides strength and toughness greater than non-aerospace grade bi-functional epoxy resins. Aerospace-grade resins suitable for use with the composite prepreg materials of this disclosure include epoxy-amine resin systems having a cure temperature in the range of about 250° F. to 355° F. Examples of such resins include, but are not limited to, a toughened epoxy resin 3900-2 available from Toray Resin Company, a division of Toray Industries, Inc., Troy, Mich., and the CYCOM® 977-3 and CYCOM® 5320-1 curing resins available from Cytec Industries Inc., West Paterson, New Jersey.

In view of its exceptional properties, graphene has attracted tremendous research interest in recent years, particularly in the field of electronics. Graphene can now be made flawlessly or with controlled flaws in a molecular monolayer of unlimited length and width (i.e., it may be scaled for roll-to-roll processing), with grain size on the order of 100 nanometers. The controlled flaws can include amino-terminated groups (or amine groups) or other chemical functionalization with controlled density. Graphene may also be formed with holes having a predetermined size and location. In addition, graphene can now be oxidized by weak acids in whole or in part to form graphene derivatives, such as graphene oxide (GO) and reduced graphene oxide (rGO), having epoxide groups throughout the graphene, on part of the graphene, or only at its edges.

It has been determined that using composite prepreg materials 34A, 34B, 34C comprising layered graphene films 35 that are bonded together through epoxy-amine bonds and/or epoxy-amine marcomolecules to form composite materials 28 as disclosed herein as a replacement for carbon reinforcement fibers 30 provides substantial benefits to the strength, stiffness and modulus of the composite materials 28. FIGS. 3A, 3B, 4A and 4B illustrate exemplary embodiments of composite prepreg materials 34A, 34B, 34C, respectively, wherein a plurality of layers of graphene films 35 are stacked on top of one another such that upper surfaces 48 and lower surfaces 49 of adjacent layers 38 of graphene film 35 are in contact (FIGS. 3A, 3B) and wherein a graphene film 35 is folded to form a crumpled graphene sheet 40 (FIGS. 4A, 4B). These embodiments are further described below.

Figure 5:
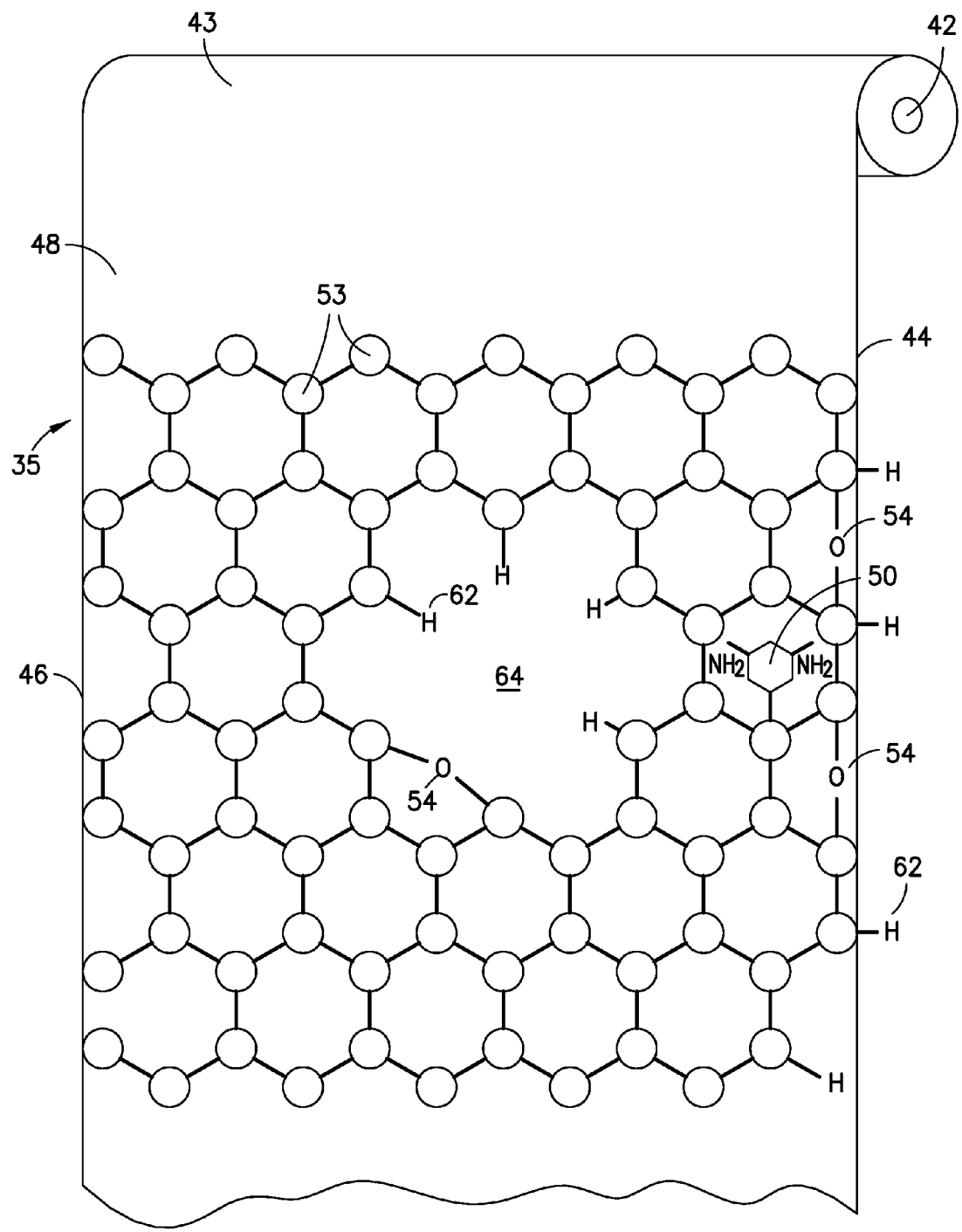
FIG. 5 is an illustration of one embodiment of a functionalized graphene film that may be used in the composite prepreg materials of this disclosure.

The graphene film 35 employed in all of the embodiments disclosed herein is formed as a long graphene sheet having a width that spans a desired width of a composite prepreg material from a first edge 44 to a second edge 46. For example, the graphene film 35 may have a width of 12 inches, 48 inches or 10 meters, or any other width suitable for a composite prepreg material. The graphene film 35 may include functionalization on an upper surface 48 and/or on a lower surface 49 of the graphene film 35 and/or at one or both of the first edge 44 and the second edge 46 or other edges in the graphene film 35. FIG. 5 is an blown-up illustration of a roll 43 of functionalized graphene film 35 wound on a spool 42 functionalized with added amine groups 50 on the upper surface 48 of the graphene film 35, and added epoxide groups 54 on the first edge 44 of the graphene film 35. Epoxide groups 54 may be added on any edge of the graphene film 35. Amine groups 50 may also be added to the lower surface 49 of the graphene film 35.

The amine groups 50 on the upper surface 48 and/or lower surface 49 of the graphene film 35 have a surface density of about 4.0E10 to about 2.0E13 groups per square millimeter of the graphene film 35. The surface density of amine groups 50 may also be described as about 0.1% to about 10.0% of carbon atoms 53 in the graphene film 35 have amine groups 50 bonded thereto. That is, 1 to 100 carbon atoms 53 per 1,000 carbon atoms in the graphene film 35 have an amine group 50 bonded thereto.

The upper surface 48 and/or lower surface 49 of the graphene film 35 may be functionalized with amine groups 50 by several methods including, for example, the methods disclosed in U.S. Publication No. 2014/0121350 A1 to YOU et al., published May 1, 2014, for preparing a polyimide-graphene composite material, and the method disclosed in Matei, Dan G. et al., "Functional Single-Layer Graphene Sheets from Aromatic Monolayers," Advanced Materials, 2013, 25, 4146-4151, WILEY-VCH Verlag GmbH & Co., Weinheim, Germany.

In one method of producing graphene film 35, illustrated in FIG. 6, polycyclic aromatic hydrocarbon (PAH) molecules 56 adsorb to a substrate 58, and the interactions of their aromatic rings cause them to form a self-assembled monolayer (SAM) 60. The remainder of each PAH molecule 56 beyond its first aromatic ring sticks up from the SAM 60. The PAH molecules 56 may be delivered to the substrate 58 via nozzles 57 arranged across a width of the substrate 58. By including a second species of PAH molecules with an amine group at some low concentration relative to the first PAH species, a SAM 60 with additional amine groups 50 can be formed. For example, one out of every 100 aromatic molecules may have an extra amine group 50 sticking up out of it. In FIG. 6, three of the four nozzles 57 deliver a first PAH species (PAH #1) and the fourth nozzle 57A positioned near one edge 59 of the substrate 58 delivers a second PAH species (PAH #2) so the amine groups 50 are positioned near the one edge 59, which becomes the first edge 44 in the graphene film 35. Some mixing occurs between the nozzles 57, 57A to form a gradient area 61 of increasing amine-functionalization toward the one edge 59. This is just one arrangement. In preferred embodiments of this disclosure, amine groups 50 may be formed anywhere on the bare substrate 58 such that the entire graphene film 35 is functionalized. The surface of the substrate 58 that the PAH molecules adsorb to become the upper surface 48 of the graphene film 35. The graphene film 35 may be flipped over to add amine groups to the lower surface 49 or amine groups 50 may be added to both the upper surface 48 and the lower surface 49 at the same time. Electron irradiation is used to induce bonds between the aromatic molecules at the substrate 58 to form a carbon nanomembrane (CNM). Temperature induced annealing in a vacuum or under protective atmosphere will complete the conversion of CNM into graphene.

Other methods of adding amine groups 50 may be used, and any type of amine structure may be added including, for example, 4, 4' diamino diphenyl sulfone; 1-(4-aminophenyl)-1,3,3-trimethylindan-5-amine; N,N-bis(4-aminophenyl)benzene-1,4-diamine; 4,4'-methylenedianiline; 4,4'-oxydianiline; 3,3'-[1,3-phenylenebis(oxy)]dianiline; 4,4'-(9H-fluorene-9,9-diyl)dianiline; 4,4'-[1,3-phenylenebis(oxy)]dianiline; 4,4'-methylenebis(2-ethylaniline); 3,3'-[(2,2-dimethylpropane-1,3-diyl)bis(oxy)]dianiline; 3,3'-[1,4-phenylenebis(methylene)]dianiline; 4,4'-sulfonylbis(N-methylaniline); 4,4'-[1,4-phenylenebis(oxy)]dianiline; 3,3'-sulfonyldianiline; aniline; 4,4'-(phenylphosphoryl)dianiline; 3-aminophenol; 4,4'-methylenedicyclohexanamine; 4,6-diethyl-2-methylbenzene-1,3-diamine; 2-(aminomethyl)-2,5,5-trimethylcyclohexanamine; 4,4'-thiodianiline; 2,2'-dimethylbiphenyl-4,4'-diamine; N-isopropyl-N'-phenylbenzene-1,4-diamine; N-(1,3-dimethylbutyl)-N'-phenylbenzene-1,4-diamine (Phenyl DMB); and N-cyclohexyl-N'-phenylbenzene-1,4-diamine (Phenyl CH).

Referring to FIG. 5, the graphene film 35 has a linear density of epoxide groups 54 formed on at least one of the first edge 44 and the second edge 46 of the graphene film 35 of about 7,000 to about 1,400,000 groups per millimeter. The density of epoxide groups 54 may also be represented as about 0.1% to about 20% of carbon atoms at the first edge 44 of the graphene film 35 have epoxide groups 54 bonded thereto. That is, 1 to 200 carbon atoms 53 per 1,000 carbon atoms 53 has an epoxide group 54 bonded thereto. Epoxide groups 54 may be formed on any edge in the graphene film 35.

Graphene film 35 may be functionalized with additional epoxide groups 54 by oxidation. Graphene, in general, can be oxidized by weak acids in whole or in part to form graphene derivatives, such as graphene oxide (GO) and reduced graphene oxide (rGO), having epoxide groups 54 throughout the graphene derivative, on part of the graphene derivative, or only at its edges. The weak acid would first attack the edges of the graphene film 35 where there are hydrogen terminations 62. The amount of oxidation is determined by the acid strength and exposure time. Examples of weak acids include formic acid, acetic acid and hydrogen sulfide. It is noted that "weak" does not mean that acid has a high pH. Instead, an acid is described as weak if it is only partially ionized in solution. Exposing the amine-functionalized graphene film 35 to a solution of formic acid for up to 30 minutes and then cleaning with ethanol may provide the desired density of epoxide groups 54.

Other methods of adding epoxide groups 54 may be used, and any type of epoxide structures may be added including, for example, 2,2'-[propane-2,2-diylbis(4,1-phenyleneoxymethylene)]dioxirane; 2,2'-[methylenebis(4,1-phenyleneoxymethylene)]dioxirane; 2,2'-[methylenebis(2,1-phenyleneoxymethylene)]dioxirane; 2,2'-[ethane-1,1-diylbis(4,1-phenyleneoxymethylene)]dioxirane; (Bis M); 4-(oxiran-2-ylmethoxy)-N,N-bis(oxiran-2-ylmethyl)aniline; 2,2'-[thiobis(4,1-phenyleneoxymethylene)]dioxirane; 2,2'-[sulfonylbis(4,1-phenyleneoxymethylene)]dioxirane; 2,2'-[butane-1,4-diylbis(oxymethylene)]dioxirane; 3-(oxiran-2-ylmethoxy)-N,N-bis(oxiran-2-ylmethyl)aniline; 2,2'-oxybis(6-oxabicyclo[3.1.0]hexane); 2,2'-[1,4-phenylenebis(oxymethylene)]dioxirane; 2,2'-[prop-1-ene-1,2-diylbis(4,1-phenyleneoxymethylene)]dioxirane; 2,2'-[1,3-phenylenebis(oxymethylene)]dioxirane; 2,2'-[cyclohexane-1,2-diylbis(oxymethylene)]dioxirane; 2,2'-[(2,2-dichloroethene-1,1-diyl)bis(4,1-phenyleneoxymethylene)]dioxirane; 2,2'-[cyclohexane-1,4-diylbis(methyleneoxymethylene)]dioxirane; (Bis I); (Bis AF); (Bis Z); (Bis C); (Bis TMC); (Bis P); 2,2'-{propane-2,2-diylbis[(2,6-dibromo-4,1-phenylene)oxymethylene]}dioxirane; 7-oxabicyclo[4.1.0]hept-3-ylmethyl 7-oxabicyclo[4.1.0]heptane-3-carboxylate.

Optionally, as shown in FIG. 5 and FIG. 7, graphene film 35 may be further functionalized by adding at least one hole 64 through the graphene film 35 to provide additional edges 66 where epoxide groups 54 can form. The at least one hole 64 may be formed by providing energy (such as with a laser) to remove molecules from the SAM prior to formation of the CNM, as disclosed herein. Preferably, the at least one hole 64 is formed in the graphene film 35 to have a substantially circular shape with a diameter of about 1-2 nanometers and a size of about 6-80 carbon atoms 37. That is, about 6-80 carbon atoms 53 are removed from the graphene film 35 to form the at least one hole 64 in the graphene film 35. As used herein, the term "substantially circular" means a shape that is either circular, approximating a circle or having rounded edges. The at least one hole 64 may be positioned anywhere on the graphene film 35. The graphene film 35 has a density of holes 64 in the range of about 4E7 to about 4E10 holes per square millimeter, or about 1 hole per 1,000 to 1 million carbon atoms. The holes 64 in the graphene film 35 provide space for molecules in, for example, a resin matrix material 32 to penetrate the holes 64 and be mechanically constrained by the graphene film 35, thereby further improving bonding capabilities.

Figure 3A:
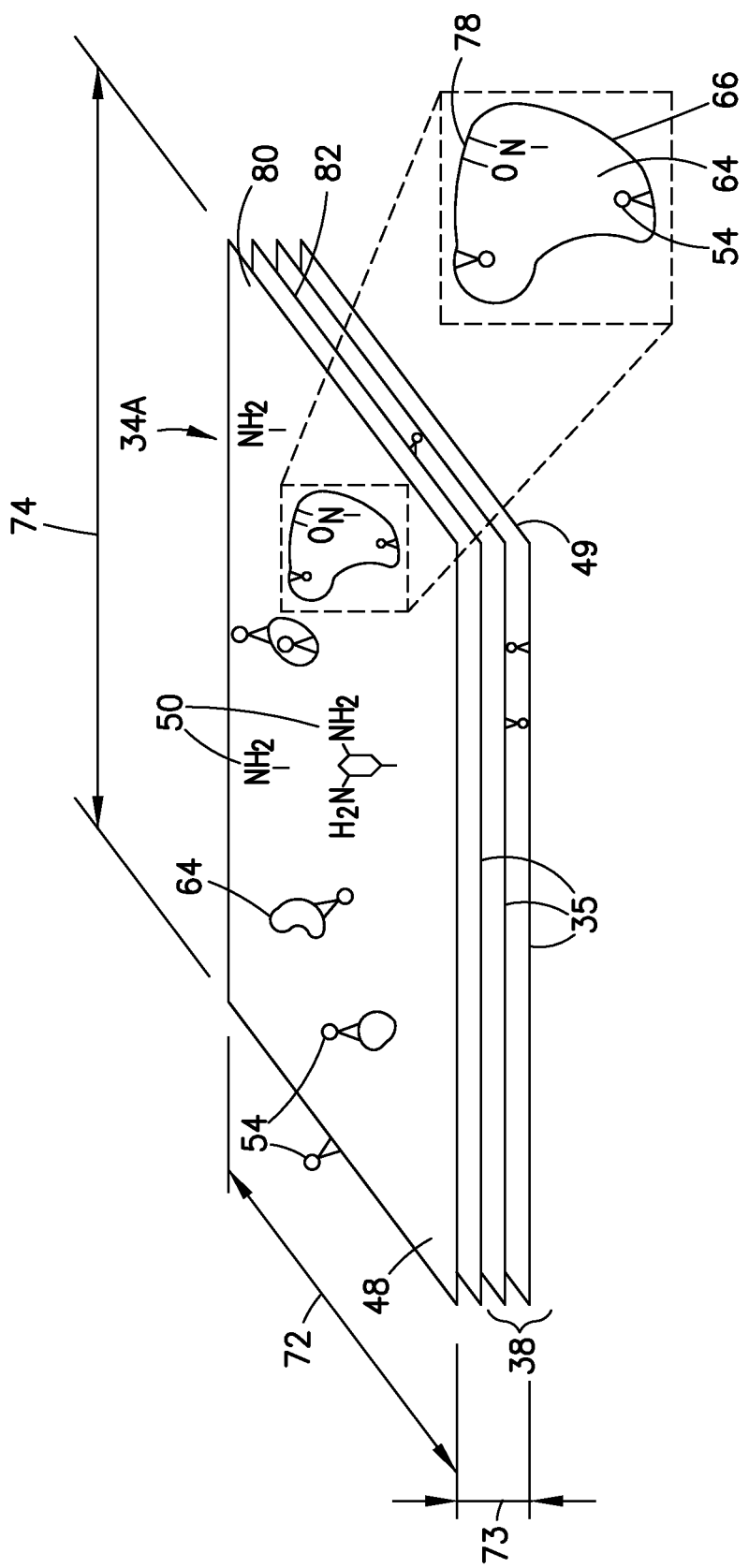
FIG. 3A is an illustration of one embodiment of a stacked composite prepreg material in accordance with this disclosure.
Figure 3B:
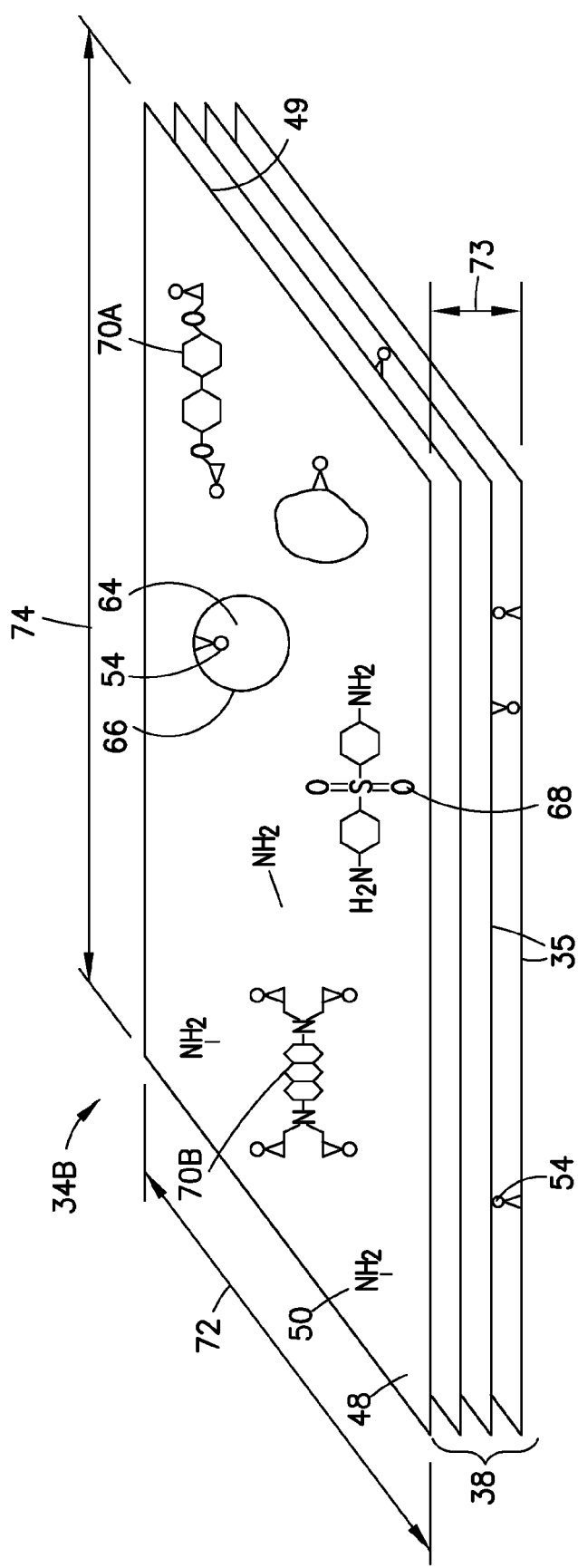
FIG. 3B is an illustration of another embodiment of a stacked composite prepreg material in accordance with this disclosure.

Referring to FIG. 3B, the upper surface 48 and/or lower surface 49 of the graphene film 35, as used in some embodiments, may be further functionalized with a density of amine monomers 68 and epoxy monomers 70A, 70B, each having a density in the range of about 1E-3 to 4E-2 (0.001 to 0.04) grams per square meter. The epoxy monomers 70A, 70B may be bifunctional epoxy monomers 70A or tetrafunctional epoxy monomers 70B. FIG. 3B shows the amine monomers 68 and epoxy monomers 70A, 70B on the graphene film 35 prior to bonding. The amine monomers 68 and epoxy monomers 70A, 70B may be deposited onto the upper surface 48 and/or lower surface 49 of the graphene film 35 using known spray coating methods and equipment. An exemplary amine monomer 68 is 44'DDS, which is readily available from many manufacturers including, for example, Jinan Haohua Industry Co. and Wuhan Fortuna Chemical Co. in China. An exemplary epoxy monomer 70A, 70B is BisF, which is also readily available from many manufacturers, including, for example, Watson International and Hangzhou Dayangchem Co. in China. In the disclosed embodiments, the amine monomers 68 and epoxy monomers 70A, 70B are placed on one of the upper surface 48 and/or lower surface 49 of the graphene film 35.

FIG. 3A shows one embodiment of a stacked composite prepreg material 34A comprising a plurality of layers of graphene film 35 having a size that spans an entire width 72 and an entire length 74 of the stacked composite prepreg material 34A. That is, each of the plurality of layers of graphene film 35 is formed to have the same width 72 and length 74 of the stacked composite prepreg material 34A. In this embodiment, the graphene film 35 is functionalized with holes 64 that are roughly circular in shape and have a size of about 6-19 carbon atoms 53, amine groups 50 having a surface density on both the upper surface 48 and the lower surface 49 of the graphene film 35 of about 4.0E10 to about 4.0E13 groups per square millimeter of the graphene film 35 and epoxide groups 54 formed on the edges 76 of the graphene film 35 and the additional edges 66 in the holes 64 of about 7,000 to about 1,400,000 groups per millimeter. FIG. 5 shows a graphene film 35 with a hole 64 having a size of 6 carbon atoms 53, i.e., 6 carbon atoms 53 are removed from the graphene film 35 to form the hole 64.

Thousands of layers of graphene film 35 are stacked to make the stacked composite prepreg material 34A. A preferred thickness of the stacked composite prepreg material 34A is about 0.006 inches, but any thickness may be used for a desired purpose. For example, the layers of graphene film 35 may be stacked to form a stacked composite prepreg material 34A having a defined thickness that can later be built up to a thickness of a composite structure 26, or the layers of graphene film 35 can be stacked to form a stacked composite prepreg 34A having a thickness and thickness contour of the composite structure 26. The stacked composite prepreg material 34A can then be cured in accordance with known processes and equipment for curing composite prepreg materials.

The stacked composite prepreg material 34A may be formed in many ways. For example, the graphene film 35 may be cut and the cut parts can be stacked on top of one another. That process can continue until the desired thickness of the composite prepreg material 34A is achieved. Another method of stacking the graphene films 35 is to merge two or more graphene film production lines to form a continuous multi-layer graphene laminate. A length of the continuous multi-layer graphene laminate may be cut to form the composite prepreg material 34A, or the continuous multi-layer graphene laminate may be cut to a desired size and stacked. For example, to form a composite prepreg material 34A having 1,024 layers of graphene film 35 from a 100 meter wide graphene film 35, one could cut the graphene 35 in half (width=50 meters), stack the two halves, cut again to form two halves (width=25 meters), stack those two halves, cut again to form two halves (width=12.5 meters), and that process may continue until the desired width 72 and thickness 73 is achieved. Cutting may also be done from the length of the graphene film 35. The graphene film 35 may be cut with a machine-mounted blade or electron beam, or with any other equipment or processes suitable for cutting graphene film 35.

The stacked layers of graphene film 35 are then heated to form epoxy-amine bonds 78 between adjacent layers 38 of the graphene film 35. The chemical structure of a typical epoxy-amine bond 78 is shown in FIG. 3A (in enlarged view) where an epoxide group 54 on an additional edge 66 in a hole 64 in a first graphene film layer 80 has reacted with an amine group 50 on the upper surface 48 of a second graphene film layer 82. Similar reactions occur between amine groups 50 on the lower surface 49 of the first graphene film layer 80 and the epoxide groups 54 on the edges 76 of the second graphene film layer 82. Preferably, every functionalized area (i.e., amine groups 50 and epoxide groups 54) on the graphene film 35 is connected to a functionalized area on an adjacent layer 38 of graphene film 35 via the formed epoxy-amine bonds 78. In this case, the stacked composite prepreg material 34A has a density of epoxy-amine bonds 78 that is the same as the densities of amine groups 50 and epoxide groups 54 disclosed above. The composite prepreg material 34A can then be formed into a composite structure and cured.

FIG. 3B shows another embodiment of a stacked composite prepreg material 34B comprising a plurality of layers of graphene film 35 having a size that spans an entire width 72 and an entire length 74 of the stacked composite prepreg material 34B. That is, each of the plurality of layers of graphene film 35 is formed to have the same width 72 and length 74 of the stacked composite prepreg material 34B. In this embodiment, the graphene film 35 is functionalized with holes 64 that are roughly circular in shape and have a size of about 12-80 carbon atoms 53, amine groups 50 having a surface density on both the upper surface 48 and the lower surface 49 of the graphene film 35 of about 4.0E10 to about 4.0E13 groups per square millimeter of the graphene film 35 and epoxide groups 54 formed on the edges 76 of the graphene film 35 and the additional edges 66 in the holes 64 of about 7,000 to about 1,400,000 groups per millimeter. The graphene film 35 in this embodiment is further functionalized with a density of amine monomers 68 (such as 44'DDS) and a density of epoxy monomers 70A, 70B (such as Bisphenyl F) each about 1.0E-3 to about 4.0E-2 (i.e., about 0.001 to about 0.04) grams per square meter. The epoxy monomer 70A is shown as a bifunctional epoxy monomer on an upper surface 48 of the graphene film 35. The epoxy monomer 70B is shown as a tetrafunctional epoxy monomer on the upper surface 48 of the graphene film 35. The layers of graphene film 35 in this embodiment may be stacked as in the previous embodiment to a desired thickness, such as the thickness of a traditional prepreg, of about 0.006 inch. This embodiment results in a composite prepreg material 34B that is a substitute for traditional prepreg, and having a series of laminated graphene films 35 bonded through epoxy-amine bonds 78 between adjacent layers 38 of graphene film 35 as in the first embodiment or with epoxy-amine macromolecules (not shown) made from amine monomers 68 and epoxy monomers 70A, 70B bonding together.

As described herein, the amine monomers 68 and epoxy monomers 70A, 70B can be sprayed onto the graphene film 35. Another approach would be to pick up the graphene film 35 on a perimeter pick up spool, and deposit the amine monomers 68 and epoxy monomers 70A, 70B on the graphene film 35 as the pickup spool is rotated, such that the graphene film 35 is layered or stacked at the same time the amine monomers 68 and epoxy monomers 70A, 70B are deposited. This laminated film would then be cut from the spool and formed to the final part shape. The result of this embodiment is a composite prepreg material that is as long as the perimeter of the spool.

Other embodiments of a stacked composite prepreg material 34B employ various combinations of amine groups 50, epoxide groups 54, amine monomers 68 and/or epoxy monomers 70A, 70B. In one embodiment, the graphene film 35 is functionalized with amine groups 50 having a surface density on both the upper surface 48 and the lower surface 49 of the graphene film 35 of about 4.0E10 to about 4.0E13, preferably in the higher range of about 4.0E12 to about 4.0E13, groups per square millimeter of the graphene film 35 and a density of epoxy monomers 70A, 70B (such as Bisphenyl F) of about 1.0E-3 to about 4.0E-2 (i.e., about 0.001 to about 0.04) grams per square meter on at least one surface of the graphene film 35. This embodiment does not require any epoxide groups 54 or amine monomers 68. In another embodiment, the graphene film 35 is functionalized with epoxide groups 54 formed on the edges 76 of the graphene film 35 and the additional edges 66 in the holes 64 of about 7,000 to about 1,400,000, preferably in the higher range of about 140,000 to about 1,400,000, groups per millimeter and a density of amine monomers 68 (such as 44'DDS) of about 1.0E-3 to about 4.0E-2 (i.e., about 0.001 to about 0.04) grams per square meter. This embodiment does not require any amine groups 50 or epoxy monomers 70A, 70B.

FIGS. 4A and 4B show another embodiment where a folded composite prepreg material 34C comprises a graphene film 35 that has been folded to form a crumpled graphene sheet 40 having a height 84 that spans an entire height 84 of the composite prepreg material 34C. In this embodiment, the graphene film is functionalized with holes 64 having a size of greater than about 100 carbon atoms, amine groups 50 having a surface density on both the upper surface 48 and the lower surface 49 of the graphene film 35 of about 4.0E10 to about 2.0E12 groups per square millimeter of the graphene film 35, and epoxide groups 54 formed on at least one edge 44 of the graphene film 35 of about 7,000 to about 700,000 groups per millimeter. The surface density of amine groups 50 may also be described as about 0.1% to about 5.0% of carbon atoms 53 in the graphene film 35 have amine groups 50 bonded thereto. That is, 1 to 50 carbon atoms 53 per 1,000 carbon atoms in the graphene film 35 have an amine group 50 bonded thereto. The density of epoxide groups 54 may also be represented as about 0.1% to about 10% of carbon atoms in the graphene film 35 have epoxide groups 54 bonded thereto. That is, 1 to 100 carbon atoms 53 per 1,000 carbon atoms 53 has an epoxide group 54 bonded thereto. The graphene film 35 in this embodiment may also be functionalized with a density of amine monomers 68 and epoxy monomers 70A, 70B as described above on at least one of the upper surface 48 or the lower surface 49 of the graphene film 35 in the range of about 1.0E-3 to about 4.0E-2 grams per square meter. The amine monomers 68 and epoxy monomers 70A, 70B move through the holes 64 in the graphene film 35.

Figure 4C:
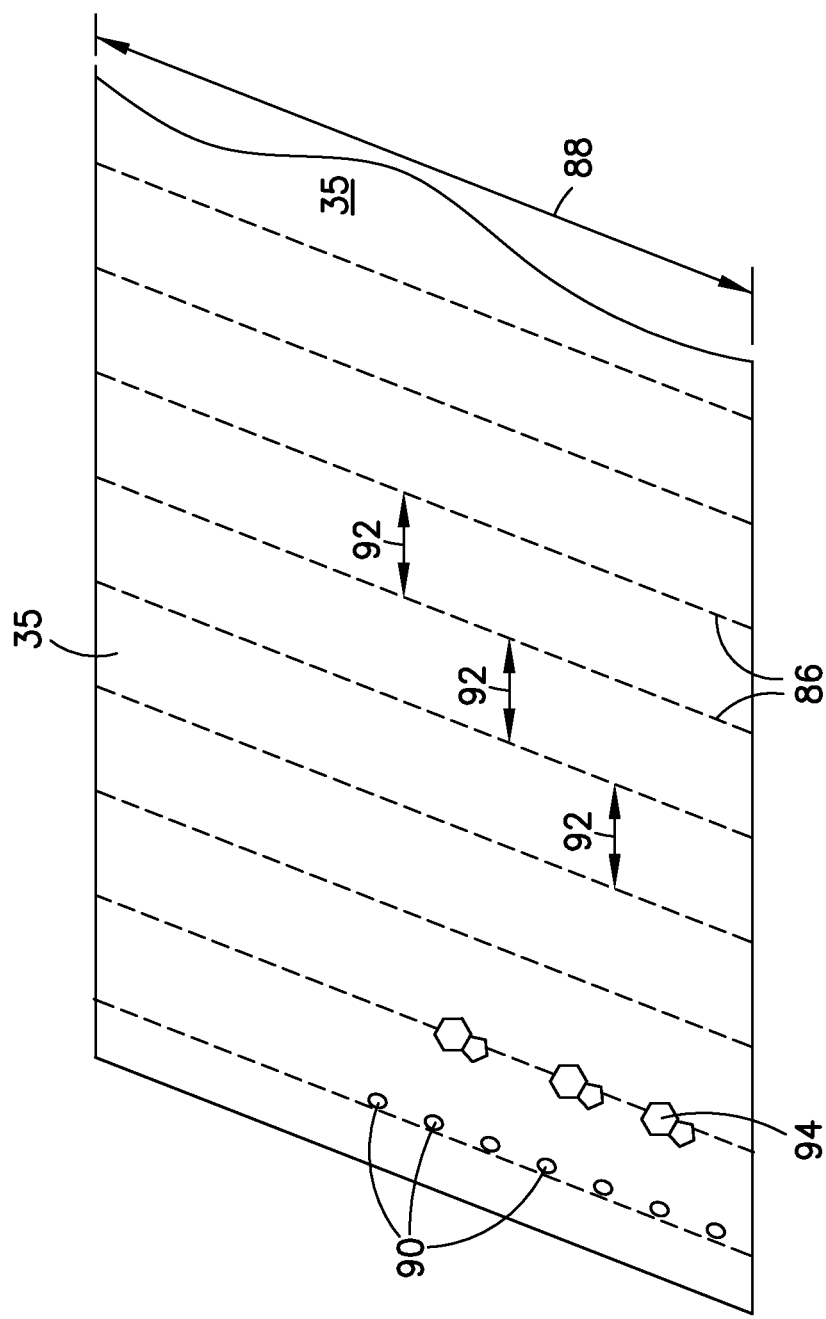
FIG. 4C is an illustration of a graphene film that may be used to make the crumpled composite prepreg material in FIGS. 4A and 4B, prior to folding the graphene film.

Referring to FIG. 4C, the graphene film 35 optionally may include regularly spaced lines 86 extending across a width 88 of the graphene film 35 to assist with folding the graphene film 35 to form the crumpled graphene sheet 40. The lines 86 permit the graphene film 35 to fold in an accordion style back and forth along the lines 86. The lines 86 are formed by chemical modification of the upper surface 48 and/or lower surface 49 of the graphene film 35 in regularly spaced lines 86 that are preferentially weaker than unmodified portions of the graphene film 35, thus permitting the graphene film 35 to fold or crumple along the lines 86. Such chemical modification may be achieved by using a laser to instigate a change in the upper surface 48 and/or lower surface 49 of the graphene film 35 during the process of producing the graphene film 35, such as a weaker area where some portion of carbon bonds in the graphene film 35 have been modified or perforations 90 along the lines 86. The lines 86 are preferably regularly spaced apart by a distance 92 approximately equal to the desired thickness of the composite prepreg material 34C (or height 84 of the crumpled graphene sheet 40). For example, to make a crumpled composite prepreg material 34C with a typical prepreg thickness of 0.006 inch, the lines 86 should be spaced apart by a distance 92 of 0.006 inch. The graphene film 35 may also be functionalized with 5-7 defects 94 along the lines 86 where the regular hexagonal lattice of carbon atoms 53 in the graphene film 35 is distributed into a pentagon connected to a heptagon. The defects may be 5-7 carbon defects formed, for example, by ion irradiation of the graphene film 35.

FIG. 8 illustrates one way of forming the crumpled graphene sheet 40 that is used to make the folded composite prepreg material 34C. The graphene film 35 may be unrolled from a spool 42 and pulled continuously through a folding case 96 in a direction shown by arrow A. Force is applied to one end 98 of the graphene film 35 in a direction shown by arrow B as it is pulled through the folding case 96 to cause the graphene film 35 to fold in an accordion style back and forth (along the lines 86 if present) and form the crumpled graphene sheet 40. The folding process may be done continuously, with roll-to-roll processing, therefore not requiring any manual intervention, or it may be done manually. The force may be applied gradually or in increments to gradually fold the graphene film 35 along the lines 86, or as shown in FIGS. 9-10, a plunger 100 may be used to apply the force to the end 98 of the graphene film 35 in the direction shown by arrow B. In FIG. 9, the graphene film 35 is inserted through the folding case 96. In FIG. 10, the plunger 100 is moved in the direction shown by arrow B to a final height 102 above the base 104 of the folding case 96 that is the same as the distance 92 between spaced apart line 86 in the graphene film 35. For example, in one embodiment, the graphene film 35 is 10 meters wide, 0.4 nanometers thick and 200 meters long as it is unwound from the roll 42 and folded into a crumpled graphene sheet 40 that is 0.3 meter wide, 0.15 mm thick (0.006 inch) and 200 meters long. The length of the graphene film 35 does not change.

After the crumple graphene sheet 40 is formed, or as it emerges from the folding case 96, it has a thickness or height 84 equal to the spaced apart distance 92 between the lines 86, and a width 85 having a size dependent on the width 88 of the graphene film 35. Resin is applied along the width 85 of the crumpled graphene sheet 40 either on the top 106 or the bottom 108 (see FIG. 4A) of the crumpled graphene sheet 40, or on both the top 106 and the bottom 108. The resin may be applied to the crumpled graphene sheet 40 with equipment and processes known for preparing prepreg, such as feeding a film of resin on backing paper and the crumpled graphene sheet 40 through heated rollers to form the crumpled composite prepreg material 34C. The crumpled composite prepreg material 34C may be used as a substitute for traditional prepreg materials. It can be cut to a desired shape and a plurality of cut to shape crumpled composite prepreg materials 34C may be laid up (or laminated together) and then cured to form a composite structure 26.

In another embodiment, the crumpled composite prepreg material 34C may be formed into a particular shape of the desired composite structure 26 by folding the graphene film 35 into the particular shape to form a crumpled graphene sheet 40 having the particular shape that can be infused with resin as described above and cured. Resin may be infused into crumpled graphene sheet 40 using known processes and equipment, such as Resin Transfer Molding (RTM) processes. For example, the crumpled graphene sheet 40 can be placed in a mold having the particular shape, and the mold is closed. Resin is infused into the mold by applying a pressure difference between the air inside the mold and outside the mold so resin will flow into the mold through inlet pipes and air/gas flows out of the mold through outlet pipes. As the resin flows into the mold and surrounds the crumpled graphene sheet 40, the resin displaces air so the result is a fully dense composite structure 26.

Crumpled composite prepreg materials 34C have improved graphitic carbon content over traditional CFRPs, and improved load transfer between resin and carbon. The crumpled composite prepreg material 34C is a macromolecule comprised of the base amine monomer (such as 44′DDS), base epoxy monomer (such as Bisphenyl F), and a single graphene macromolecule.

Figure 11:
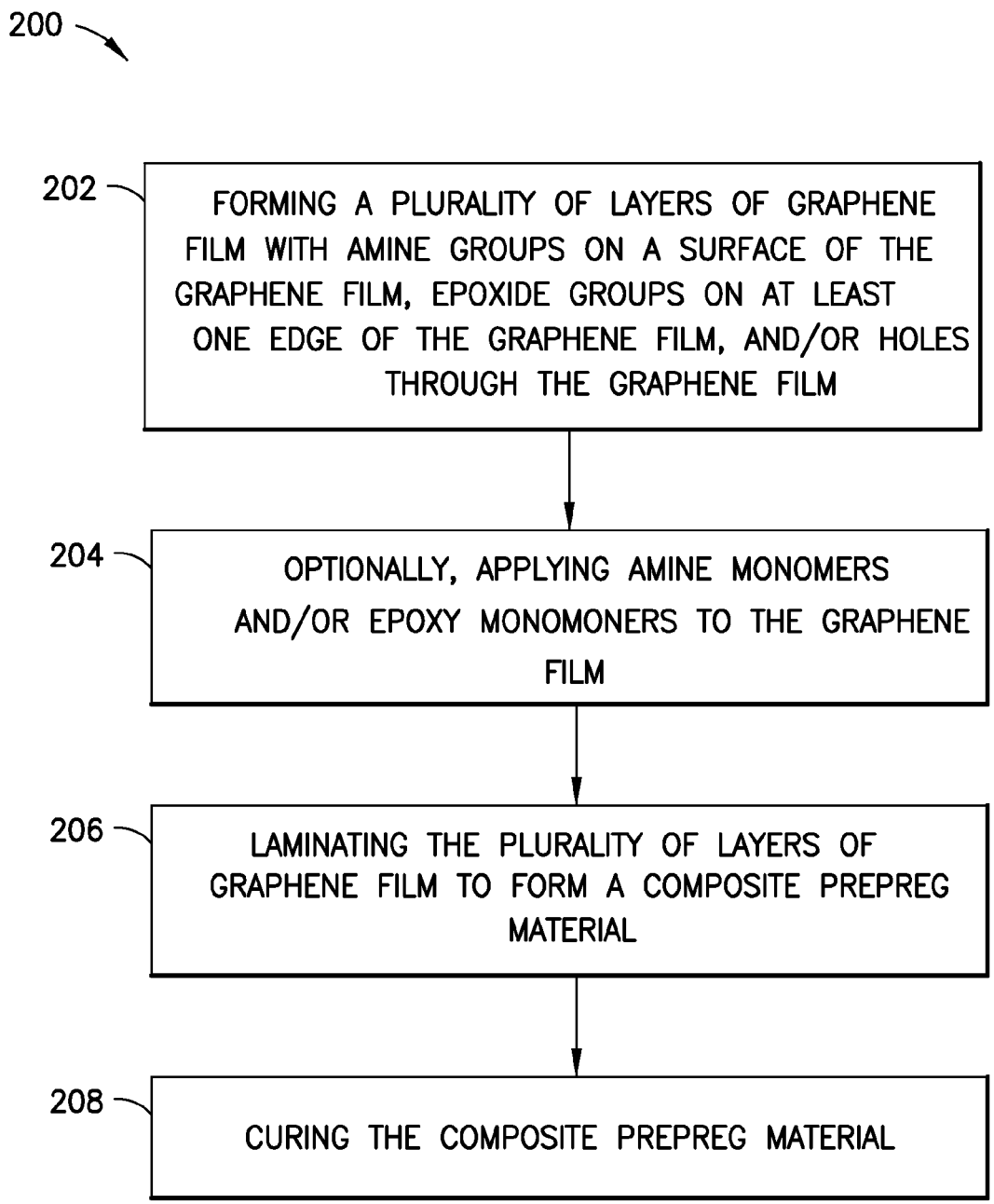
FIG. 11 is an illustration of a flow diagram of an exemplary method for making a composite prepreg material in accordance with this disclosure.

FIG. 11 is an illustration of a flow diagram of an exemplary embodiment of a method 200 of making a stacked composite prepreg material 34A, 34B as shown in FIGS. 3A and 3B. The method 200 comprises step 202 of forming a plurality of layers of graphene film 35 optionally having amine groups 50 formed on an outer surface 48 of the graphene film 35, epoxide groups 54 formed on at least one of the first edge 44 and second edges 46 of the graphene film 35, and/or holes 44 formed through the graphene film 35 in accordance with the disclosure above. In step 204, amine monomers 68 and/or epoxy monomers 70A, 70B may be applied to the graphene film as disclosed above. In step 206, the plurality of layers of graphene film 35 are stacked and laminated together through epoxy-amine bonds 78 to form a stacked composite prepreg material 34A, 34B as disclosed above. In step 208, the stacked composite prepreg material 34A, 34B may be combined with other stacked composite prepreg materials 34A, 34B or traditional prepreg materials and cured to form a composite structure 26.

Figure 12:
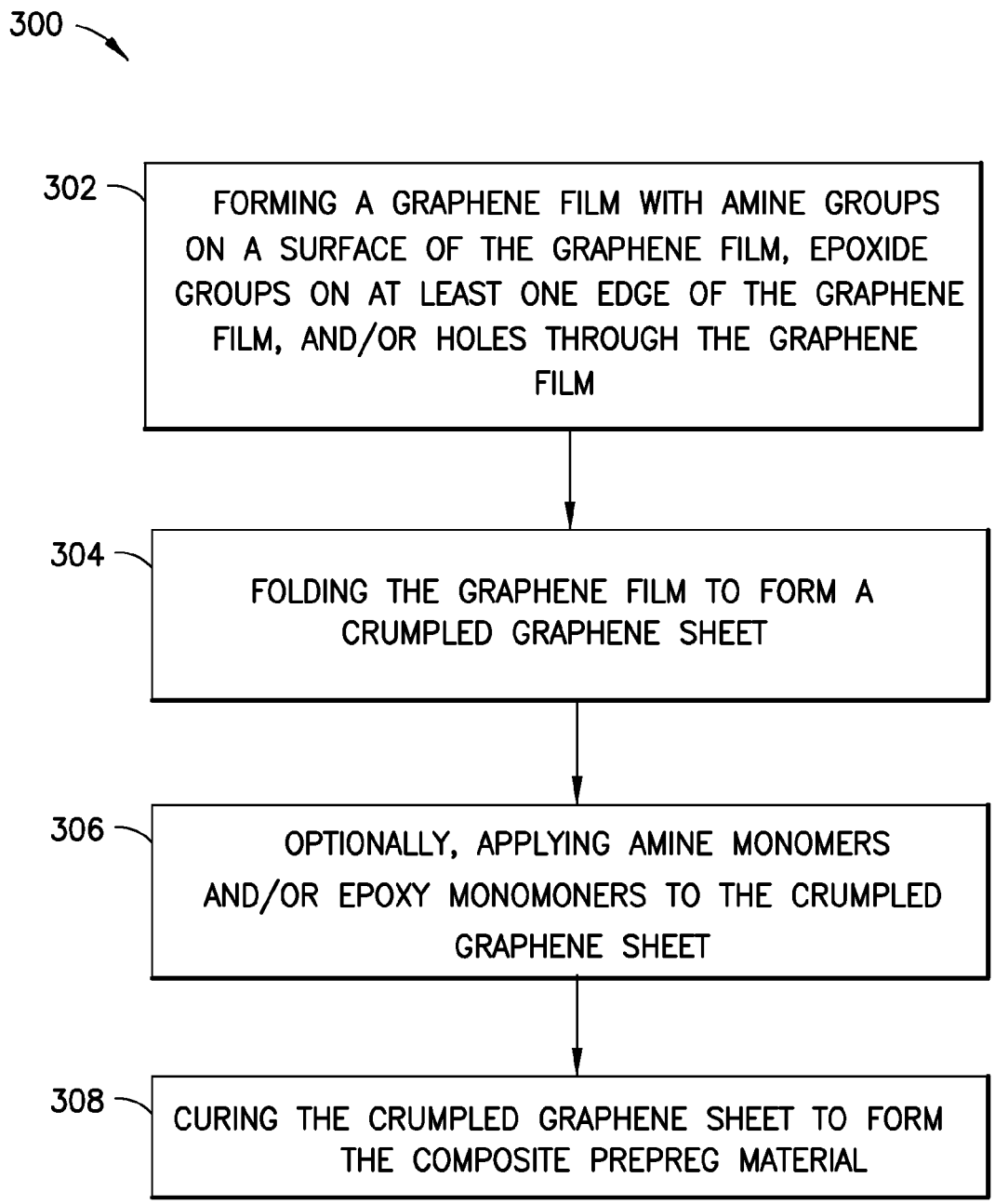
FIG. 12 is an illustration of a flow diagram of another exemplary method for making a composite prepreg material in accordance with this disclosure.

FIG. 12 is an illustration of a flow diagram of another exemplary embodiment of a method 300 of making a crumpled composite prepreg material 34C as shown in FIGS. 4A and 4B. The method 300 comprises step 302 of forming a plurality of layers of graphene film 35 optionally having amine groups 50 formed on an outer surface 48 of the graphene film 35, epoxide groups 54 formed on at least one of the first edge 44 and second edges 46 of the graphene film 35, and/or holes 44 formed through the graphene film 35 in accordance with the disclosure above. Other functionalization of the graphene film 35 may be applied, as well as lines 86 to assist with folding. In step 304, the graphene film 35 is folded as described above to form the crumpled graphene sheet 40. In step 306, amine monomers 68 and/or epoxy monomers 70A, 70B may be applied to the crumpled graphene sheet as disclosed above. In step 308, the crumpled graphene sheet 40 is cured to form the crumpled composite prepreg material 34C is cured, or resin may be applied prior to curing.

Many other modifications and variations may of course be devised given the above description of various embodiments for implementing the principles in the present disclosure. It is intended that all such modifications and variations be considered as within the spirit and scope of this disclosure, as defined in the following claims.

The invention claimed is:

1. A composite prepreg material comprising a plurality of layers of graphene film having a size that spans an entire width and an entire length of the composite prepreg material, each of the layers of graphene film being functionalized with holes formed through the graphene film, amine groups formed on both an upper and a lower surface of the graphene film and/or epoxide groups formed on at least one edge of the graphene film.

2. The composite prepreg material of claim 1, wherein the layers of graphene film are stacked on top of one another such that upper and lower surfaces of adjacent layers of the graphene film are in contact.

3. The composite prepreg material of claim 2, wherein the adjacent layers of the graphene film are bonded together through epoxy-amine bonds.

4. The composite prepreg material of claim 3, wherein the graphene film is functionalized with holes having a size of about 12-80 carbon atoms, amine groups having a surface density on both the upper and the lower surface of the graphene film of about 4.0E10 to about 4.0E13 groups per square millimeter of the graphene film and epoxide groups formed on the at least one edge of about 7,000 to about 1,400,000 groups per millimeter.

5. The composite prepreg material of claim 4, wherein the graphene film further comprises a density of amine monomers and epoxy monomers of about 1.0E-3 to about 4.0E-2 grams per square meter.

6. The composite prepreg material of claim 3, wherein the graphene film is functionalized with holes having a size of about 12-80 carbon atoms, amine groups having a surface density on both the upper and the lower surface of the graphene film of about 4.0E12 to about 4.0E13 groups per square millimeter of the graphene film, and a density of epoxy monomers on at least one surface of the graphene film about 1.0E-3 to about 4.0E-2 grams per square meter.

7. The composite prepreg material of claim 3, wherein the graphene film is functionalized with holes having a size of about 12-80 carbon atoms, epoxide groups formed on the at least one edge of about 140,000 to about 1,400,000 groups per millimeter, and a density of amine monomers on at least one surface of the graphene film about 1.0E-3 to about 4.0E-2 grams per square meter.

8. The composite prepreg material of claim 3, wherein the graphene film is functionalized with holes having a size of about 6-19 carbon atoms, amine groups having a surface density on both the upper and the lower surface of the graphene film of about 4.0E10 to about 4.0E13 groups per square millimeter of the graphene film and epoxide groups formed on the at least one edge of about 7,000 to about 1,400,000 groups per millimeter.

9. The composite prepreg material of claim 1, wherein the graphene film has a density of holes in the range of about 4E7 to about 4E10 holes per square millimeter, or about one hole per 1,000 to 1 million carbon atoms.

10. The composite prepreg material of claim 1, wherein the graphene film is folded to form a crumpled graphene sheet having a height that spans an entire height of the composite prepreg material.

11. The composite prepreg material of claim 10, wherein the graphene film is functionalized with holes having a size of greater than about 100 carbon atoms, amine groups having a surface density on both the upper and the lower surface of the graphene film of about 4.0E10 to about 4.0E13 groups per square millimeter of the graphene film and epoxide groups formed on the at least one edge of about 7,000 to about 1,400,000 groups per millimeter.

12. The composite prepreg material of claim 11, wherein the graphene film further comprises a density of amine monomers and epoxy monomers on at least one surface of the graphene film in the range of about 1.0E-3 to about 4.0E-2 grams per square meter.

13. The composite prepreg material of claim 10, wherein the graphene film further comprises lines extending across a width of the graphene film where some portion of carbon bonds in the graphene film have been modified to permit the graphene film to preferentially fold along the lines.

14. A method of making a composite prepreg material comprising the steps of:
   forming a plurality of layers of graphene film functionalized with holes formed through the graphene films, amine groups formed on both an upper and a lower surface of the graphene film and/or epoxide groups formed on at least one edge of the graphene film and having a size that spans an entire width and an entire length of the composite prepreg material; and
   laminating the plurality of layers of graphene film to form the composite prepreg material.

15. The method of claim 14, wherein forming the plurality of layers of graphene film comprises stacking the plurality of layers on top of one another such that upper and lower surfaces of adjacent layers of the graphene film are in contact.

16. The method of claim 15, wherein laminating the plurality of layers of the graphene film comprises applying heat to form epoxy-amine bonds between the adjacent layers of graphene film.

17. The method of claim 16, wherein the graphene film is functionalized with holes having a size of about 12-80 carbon atoms, amine groups having a surface density on both the upper and the lower surface of the graphene film of about 4.0E10 to about 4.0E13 groups per square millimeter of the graphene film and epoxide groups formed on the at least one edge of about 7,000 to about 1,400,000 groups per millimeter.

18. The method of claim 17, wherein the graphene film further comprises a density of amine monomers and epoxy monomers in the range of about 1.0E-3 to about 4.0E-2 grams per square meter.

19. The method of claim 16, wherein the graphene film is functionalized with holes having a size of about 12-80 carbon atoms, amine groups having a surface density on both the upper and the lower surface of the graphene film of about 4.0E12 to about 4.0E13 groups per square millimeter of the graphene film, and a density of epoxy monomers on at least one surface of the graphene film about 1.0E-3 to about 4.0E-2 grams per square meter.

20. The method of claim 16, wherein the graphene film is functionalized with holes having a size of about 12-80 carbon atoms, epoxide groups formed on the at least one edge of about 140,000 to about 1,400,000 groups per millimeter, and a density of amine monomers on at least one surface of the graphene film about 1.0E-3 to about 4.0E-2 grams per square meter.

21. The method of claim 16, wherein the graphene film is functionalized with holes having a size of about 6-19 carbon atoms, amine groups having a surface density on both the upper and the lower surface of the graphene film of about 4.0E10 to about 4.0E13 groups per square millimeter of the graphene film and epoxide groups formed on the at least one edge of about 7,000 to about 1,400,000 groups per millimeter.

22. The method of claim 14, wherein the graphene film has a density of holes in the range of about 4E7 to about 4E10 holes per square millimeter, or about one hole per 1,000 to 1 million carbon atoms.

23. The method of claim 14, wherein forming the plurality of graphene layers comprises folding the graphene film to form a crumpled graphene sheet having a height that spans an entire height of the composite prepreg material.

24. The method of claim 23, wherein the graphene film is functionalized with holes having a size of greater than about 100 carbon atoms, amine groups having a surface density on both the upper and the lower surface of the graphene film of about 4.0E10 to about 4.0E13 groups per square millimeter of the graphene film and epoxide groups formed on the at least one edge of about 7,000 to about 1,400,000 groups per millimeter.

25. The method of claim 23, wherein the graphene film further comprises a density of amine monomers and epoxy monomers on at least one surface of the graphene film in the range of about 1.0E-3 to about 4.0E-2 grams per square meter.

26. The method of claim 23, further comprising modifying a portion of carbon bonds in the graphene film along lines extending across a width of the graphene film, and folding the graphene film along the lines.

27. The method of claim 23, further comprising impregnating a film of resin onto both a top and a bottom of the crumpled graphene sheet.

28. The method of claim 23, further comprising forming the crumpled graphene sheet into a final product shape, infusing a resin into the crumpled graphene sheet via resin transfer molding and curing the crumpled graphene sheet to form a composite material.

* * * * *